United States Patent [19]

Fedeli et al.

[11] Patent Number: 5,113,575
[45] Date of Patent: May 19, 1992

[54] PROCESS FOR PRODUCING A MAGNETIC HEAD WITH AN APPROPRIATELY ORIENTED EASY AXIS OF MAGNETIZATION

[75] Inventors: Jean-Marc Fedeli, Beaucroissant; Hubert Moriceau, St. Egreve; Viviane Muffato, Vif; Marie-Hélène Vaudaine, Seyssins, all of France

[73] Assignee: Commissariat a l'Energie Atomique, Paris, France

[21] Appl. No.: 571,112

[22] Filed: Aug. 23, 1990

[30] Foreign Application Priority Data

Sep. 6, 1989 [FR] France ................. 89 11643

[51] Int. Cl.⁵ .............................. G11B 5/42
[52] U.S. Cl. ....................... 29/603; 360/119; 360/125; 427/131
[58] Field of Search ........... 29/603; 360/119-121, 360/125-127; 427/128-131

[56] References Cited

U.S. PATENT DOCUMENTS 4,399,479 8/1983 Meckel.

FOREIGN PATENT DOCUMENTS 0152064 8/1985 European Pat. Off.

OTHER PUBLICATIONS

IBM Technical Disclosure Bulletin, vol. 17, No. 11, Apr. 1975, Armonk, N.Y. U.S.A. pp. 3446-3449; L. T. Ramankiw et al: "Batch Fabrication of Keyhole Type Magnetic Recording Heads."
Patent Abstracts of Japan, vol. 8, No. 183 (P-296) (1620) Aug. 23, 1984, & JP-A-59 072636 (Nippon Denki K.K.) Apr. 24, 1984.
Patent Abstracts of Japan vol. 8, No. 165 (P-291) (1602) Jul. 31, 1984, & JP-A-59 060723 (Fujitsu K.K.) Apr. 6, 1984.
Patent Abstracts of Japan vol. 13, No. 314 (P-899) (3552) Jul. 18, 1989, & JP-A-01 84406 (Sony Corp.) Mar. 29, 1989.
Patent Abstracts of Japan vol. 11, No. 342 (P-635) (2789) Nov. 10, 1987, & JP-A-62 124620 (Yokogawa Electric Corp.) Jun. 5, 1987.

Primary Examiner—Carl E. Hall
Attorney, Agent, or Firm—Oblon, Spivak, McClelland, Maier & Neustadt

[57] ABSTRACT

Process for producing a magnetic head with an appropriately oriented easy axis of magnetization and head obtained by this process.

According to the invention, a large magnetic pattern (52) is formed around a spacer and then said pattern is etched in order to give it the desired shape. In the narrow horizontal branch, the easy axis of magnetization is oriented parallel to the air gap.

Application to magnetic recording.

6 Claims, 6 Drawing Sheets

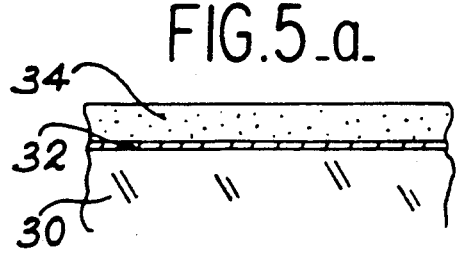
FIG.5_a_
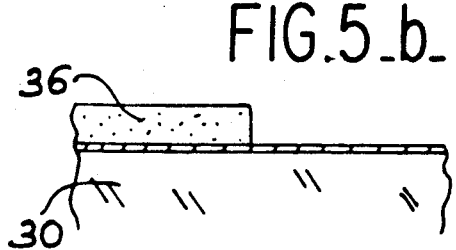
FIG.5_b_
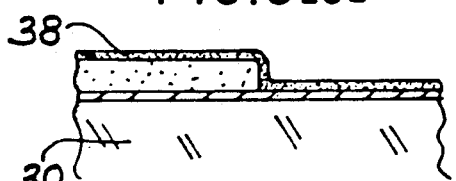
FIG.5_c_
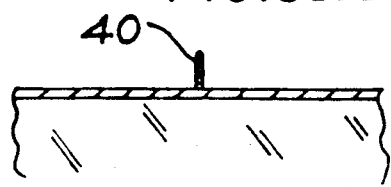
FIG.5_d_
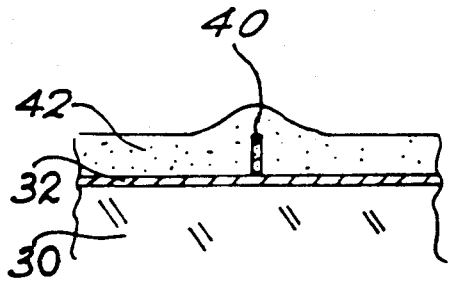
FIG.5_e_
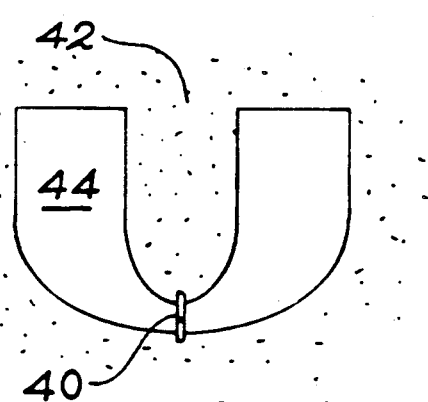
FIG.5_f_
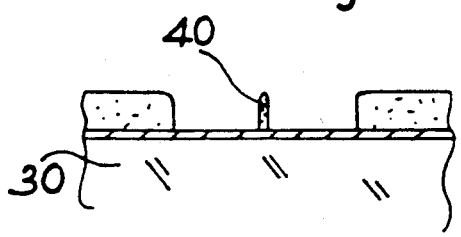
FIG.5_g_
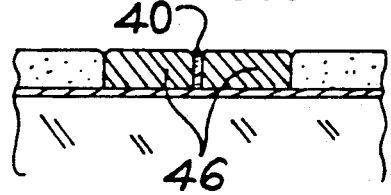
FIG.5_h_
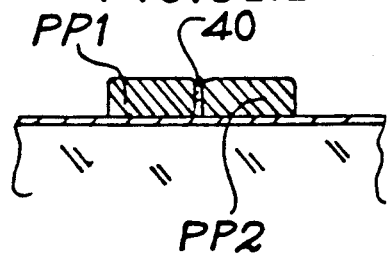
FIG.5_i_
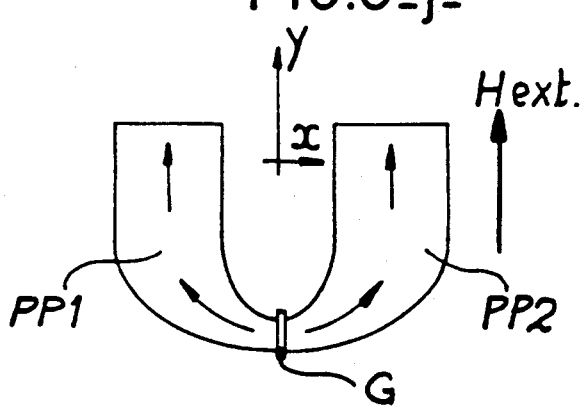
FIG.5_j_

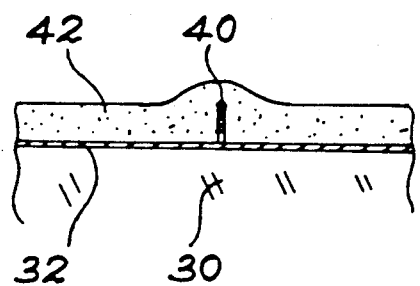
FIG.6_a_
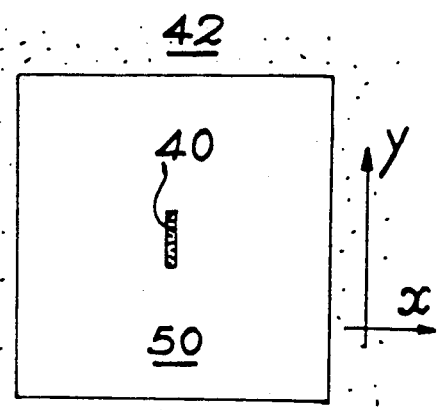
FIG.6_b_
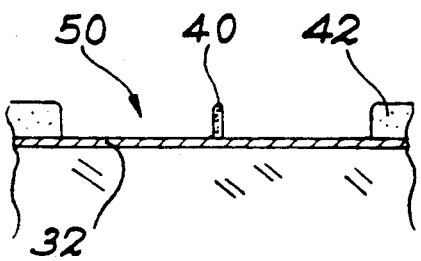
FIG.6_c_
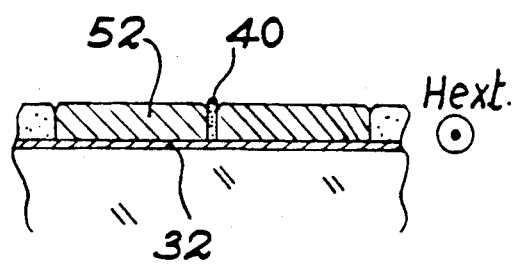
FIG.6_d_
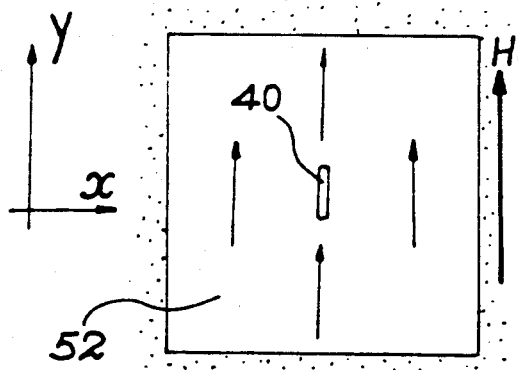
FIG.6_e_
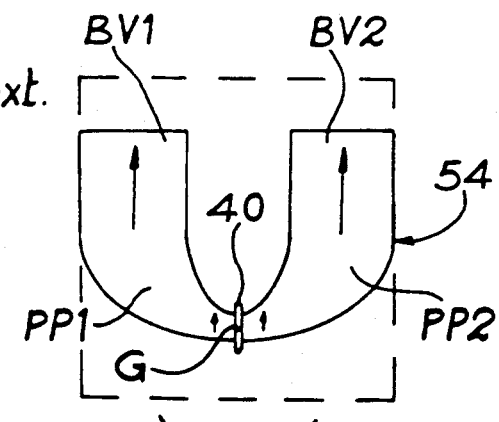
FIG.6_f_

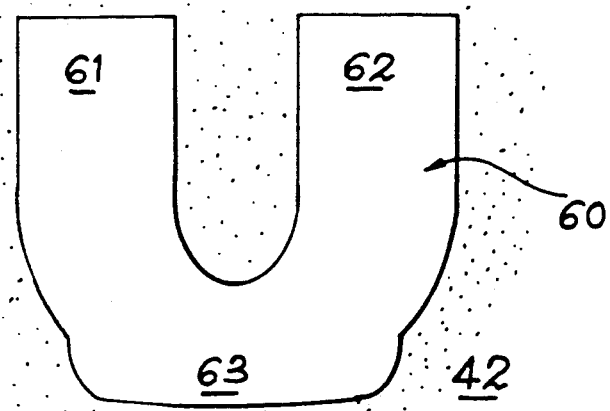
FIG.7_a_
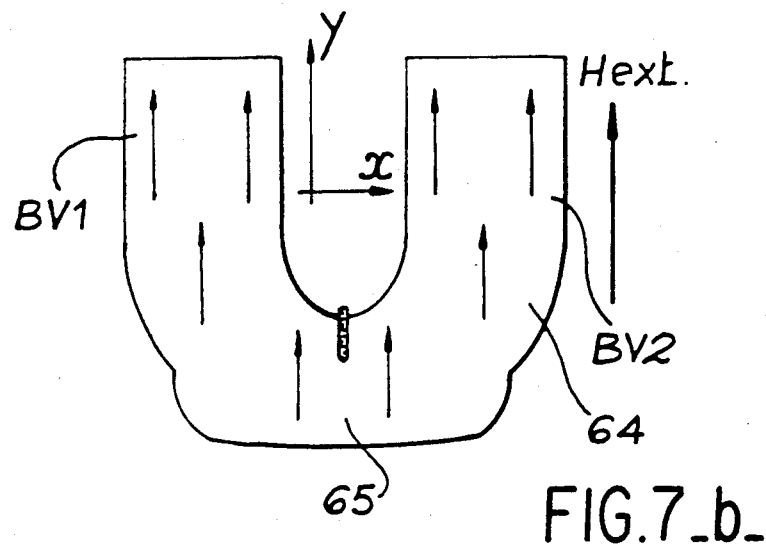
FIG.7_b_
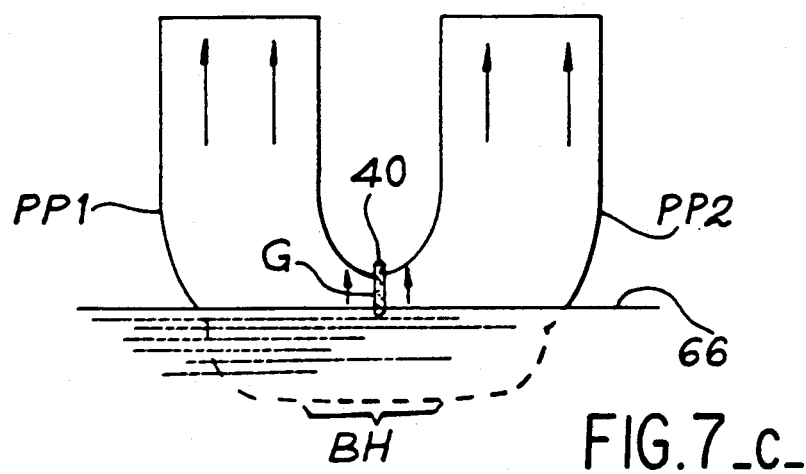
FIG.7_c_

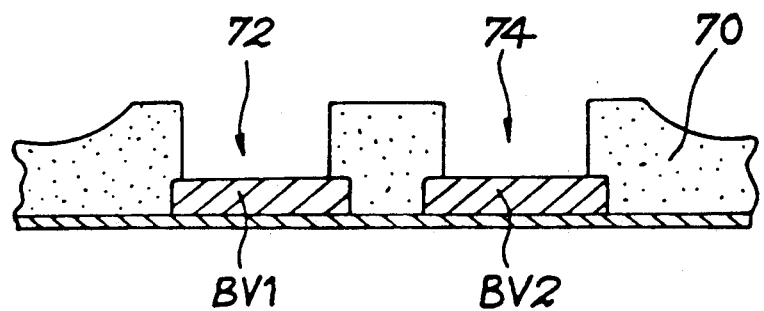
FIG.8_a_
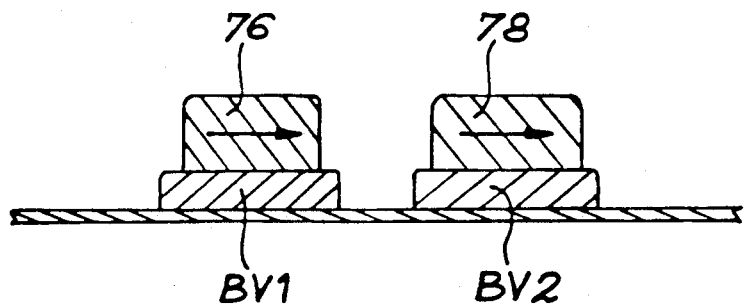
FIG.8_b_
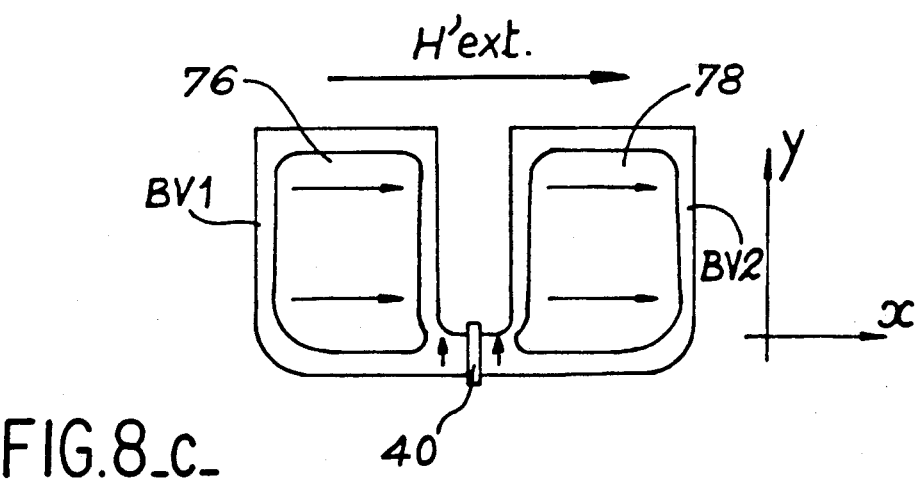
FIG.8_c_

PROCESS FOR PRODUCING A MAGNETIC HEAD WITH AN APPROPRIATELY ORIENTED EASY AXIS OF MAGNETIZATION

BACKGROUND OF THE INVENTION

1. Field of the Invention

The present invention relates to a process for producing a magnetic head with an appropriately oriented easy axis of magnetization and to a head obtained by this process. The invention is used in magnetic recording. The head obtained by the process according to the invention can either be of the writing and reading, or the reading or writing type.

2. Discussion of the Background

FIGS. 1 and 2 show an embodiment of such reading and writing magnetic heads for narrow recording tracks. The magnetic head 10 is located on the lateral face 12 of a support 14 having a generally catamaran shape. The recording medium carries the reference 16 and its width is approximately 2 μm.

The head essentially comprises a magnetic circuit having a first part constituted by two pole pieces PP1, PP2 (e.g. of FeNi) of limited thickness (e.g. 2 μm) separated by a very narrow air gap G (e.g. 0.3 μm). These pole pieces form a U-shaped pattern with two "vertical" branches BV1, BV2 (i.e. having a direction generally perpendicular to the plane of the recording support), said branches being relatively wide (a few tenths of a mm) and a "horizontal" branch BH (i.e. parallel to the recording medium) and which is much narrower (approximately 1/10 mm).

The magnetic head comprises a second part to enable the magnetic flux to form a closed loop. In FIG. 2, said second part is in the form of a ferrite bar 20 bonded at its two ends to the pole pieces. This bar is surrounded by a conductor coil 22, e.g. made from copper and with a diameter of 15 μm. Such a head is able to read and write on the medium 16.

There are numerous other types of heads, e.g. with a coil formed from thin films deposited by microelectronics methods as described in FR-A-2 604 021, or read only heads with magnetosensitive elements inserted in the magnetic circuit and as described e.g. in FR-A-2 612 676 or EP-A-0 269 129.

As the invention essentially relates to the production of the first part of the magnetic circuit, namely the U-shaped part with two pole pieces and an air gap, there is no need to describe all these variants, that shown by FIGS. 1 and 2 being adequate for understanding the problem solved by the invention.

FIG. 3 gives the essence of the functions fulfilled by such a head. The head is placed in front of a track on medium 16 having a magnetization able to assume either of two directions. The magnetic induction in the pole pieces PP1 and PP2 is represented by arrows. This induction is closed by a rear part 25 (not shown). The induction is substantially horizontal in the narrow horizontal branch BH (i.e. parallel to an axis x) and substantially vertical in the two wide vertical branches BV1, BV2 (i.e. parallel to an axis y).

In order to reduce the noise in the electric reading signal and obtain a good efficiency of the head, the easy axis of magnetization of the magnetic layer forming the pole pieces (magnetization obtained in the absence of any external field) must be perpendicular to the induction obtained in the presence of a recording support, in order to best take advantage of the coherent rotation phenomenon of the magnetization in the magnetic layer.

In the inoperative state, i.e. remote from any recording medium, the magnetization would ideally have the configuration shown in FIG. 4, with a generally vertical direction (parallel to y) in the narrow horizontal branch BH and around the air gap G and a generally horizontal direction (parallel to x) in the two wide vertical branches BV1, BV2.

When using without particular precautions the known processes for producing such heads and e.g. processes using electrolytic deposits, as described in U.S. Pat. No. 4,402,801 or EP-A-0 262 028, it is not possible to obtain this ideal situation. It is even possible to obtain the opposite situation as is shown in FIG. 5, which illustrates a few stages in the production of such a head.

The following operations are carried out in known manner:

on a non-conductive substrate 30 is deposited a metal layer 32 and then a resin 34 (FIG. 5a); (if the substrate is conductive or semiconductive there is no need for the metal layer);

the resin is exposed and developed to obtain a step 36 (FIG. 5b);

this is followed by the deposition of an nonmagnetic material layer 38, e.g. of silica (FIG. 5c);

by reactive ionic etching removal takes place of the horizontal portions of the layers 36 and 38 so as to only leave an amagnetic wall 40 (d);

this is all covered with resin 42 (e);

in the resin is etched a trench 44 shaped like a U-shaped pattern and which is intended to constitute the future pole pieces (f in plan view and g in section through the wall 40);

an electrolytic deposit 46 is formed in the trench, e.g. of FeNi, in the presence of an external field Hext (h);

the remainder of the resin is made to disappear and the U-shaped circuit is obtained with its two pole pieces PP1 and PP2, the amagnetic spacer 40 being in the air gap G (i,j).

In order to attempt to obtain an easy axis of magnetization parallel to the air gap, Hext is directed parallel to the wall 40. Although the easy axis of magnetization is parallel to Hext in the vertical branches of the U-shaped pole pieces PP1 and PP2, due to a very marked edge effect creating an anisotropy in the narrow horizontal branch the easy axis of magnetization switches and is parallel to the horizontal edges. The result obtained (FIG. 5j) is consequently the opposite to the desired result (FIG. 4).

On switching or tilting the external field Hext by 90°, the desired orientation would indeed be obtained in the wide branches, but the orientation would a fortiori be poor in the vicinity of the air gap. However, it is in this narrow zone that the magnetic phenomena are the most intense and require an appropriate orientation of the easy axis of magnetization.

SUMMARY OF THE INVENTION

It is an object of the present invention to obviate the above-described disadvantages.

Another object of the invention is to provide a novel process for making a magnetic head having, in the narrow horizontal branch and on either side of the air gap, an orientation of the easy axis of magnetization parallel to the air gap (in other words parallel to the spacer or the axis y).

It is a further object of the invention to provide a magnetic head having an orientation of the easy axis of magnetization in the two wide vertical branches perpendicular to the air gap (i.e. perpendicular to the air gap, spacer or axis y).

These and other objects are achieved by forming a large magnetic pattern, which avoids the edge effect phenomena, said pattern then being brought to the requisite dimensions once the magnetization has been appropriately oriented.

More specifically, the invention relates to a process essentially comprising the following operations:

forming a nonmagnetic spacer on a substrate, said spacer having a thickness equal to that of the future air gap and a certain general direction, depositing around the spacer a magnetic layer in order to constitute a pattern having, in the zone of the spacer, much larger dimensions than those of the future narrow horizontal branch and, during this operation, a magnetic field with a direction parallel to that of the spacer is applied, the thus obtained magnetic layer having in the pattern an easy axis of magnetization parallel to the spacer, eliminating the superfluous part of said layer in the zone of the spacer in order to only retain the desired narrow horizontal branch, which then has an easy axis of magnetization parallel to the spacer.

The invention provides two variants of this process:

in the first is formed a substantially rectangular magnetic pattern around the spacer and said pattern is then etched so as to only leave the desired U-shaped circuit with its narrow horizontal branch and its two wide vertical branches, the entity obtained then being cut and polished in a conventional manner;

in the second a pattern is formed with two vertical branches already having the final shape and a horizontal branch which is much wider than the final desired horizontal branch, the entity then being cut and polished perpendicular to the spacer in order to eliminate the superfluous lower portion of the horizontal branch and give it its final width.

In order to obtain the required ideal orientations both in the horizontal branch and in the two vertical branches, it is possible to continue the process by depositing, on the vertical branches, a supplementary magnetic layer in the presence of a magnetic field with a direction perpendicular to that of the spacer, in order to obtain two overthicknesses having an easy axis of magnetization perpendicular to the direction of the spacer.

In all these embodiments, the deposition of the magnetic layer or layers can be carried out by the electrolytic deposition method. However, it is possible to use any other known method such as e.g. cathodic sputtering.

The invention also relates to a magnetic head obtained by the process defined hereinbefore. It is characterized by the fact that in the narrow horizontal branch of the U, the easy axis of magnetization is parallel to the spacer.

In an advantageous variant, the two wide vertical branches have in each case an overthickness with an easy axis of magnetization perpendicular to the spacer.

BRIEF DESCRIPTION OF THE DRAWINGS

The invention is described in greater detail hereinafter relative to non-limitative embodiments and the attached drawings, wherein:

FIGS. 5a–5j are view illustrating various stages of a process for producing a head in accordance with the prior art;

FIGS. 6a–6f are views illustrating the steps of a first embodiment of the process according to the invention;

FIGS. 7a–7c are views illustrating the steps of a second embodiment of the process according to the invention; and FIGS. 8a–8c are views illustrating the steps of a third embodiment of the process according to the invention.

The process according to the invention uses the first operations of the process described in connection with FIG. 5 and more particularly those leading to the stages illustrated in FIGS. a to e inclusive and will not be described further for brevity. FIG. 6 shows the sequence of operations to be carried out starting from the component illustrated in FIG. 5e. This component comprises a substrate 30, a metal layer 32, an nonmagnetic spacer 40 and a resin layer 42 (i.e. FIG. 6a is identical to FIG. 5e). According to the invention, the process is continued by the following operations:

Figure 1:
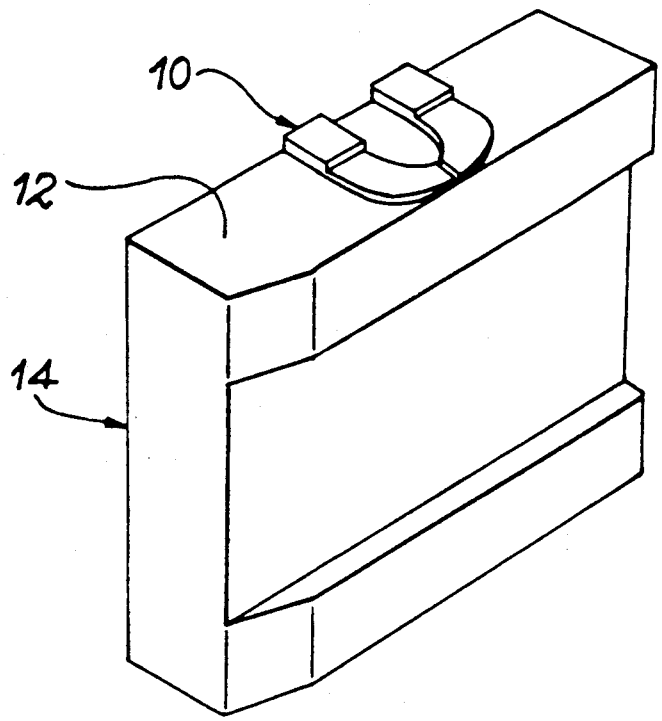
FIG. 1 is a diagram of a magnetic head on a catamaran-shaped pad.
Figure 2:
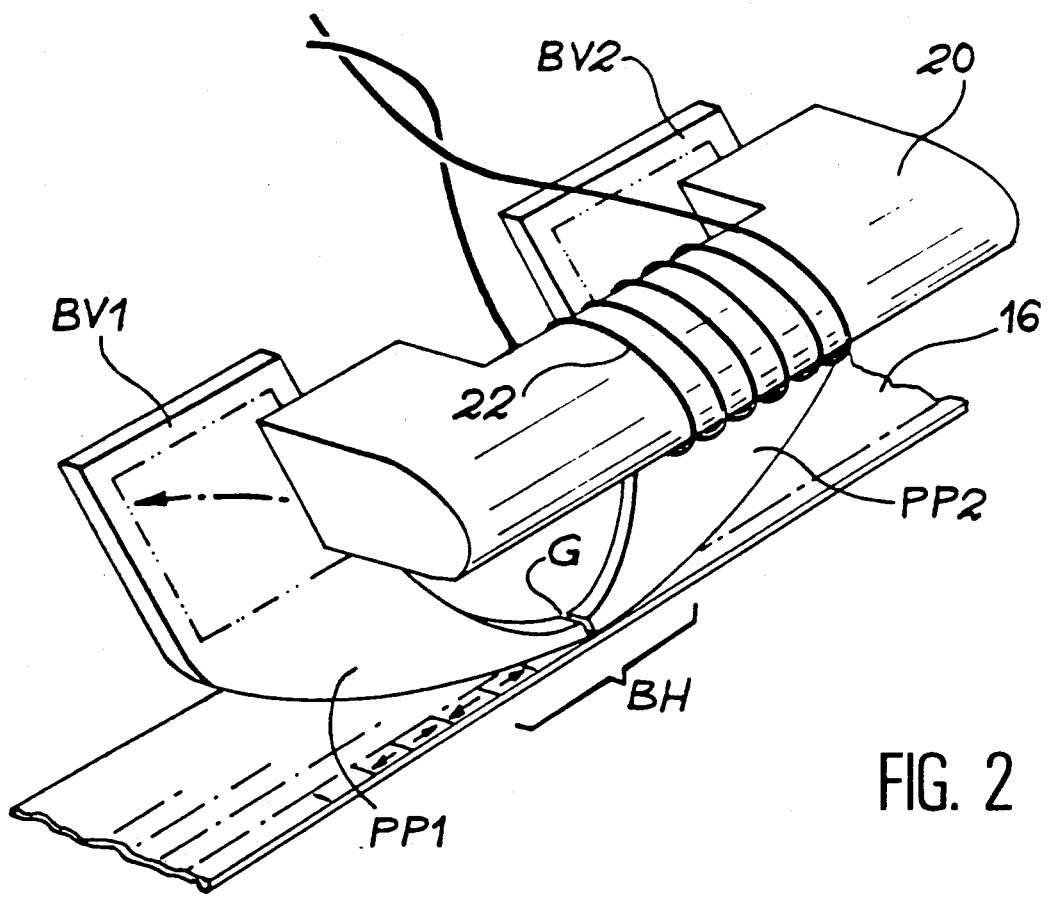
FIG. 2 is a diagram illustrating the placing of a ferrite bar with a coil.
Figure 3:
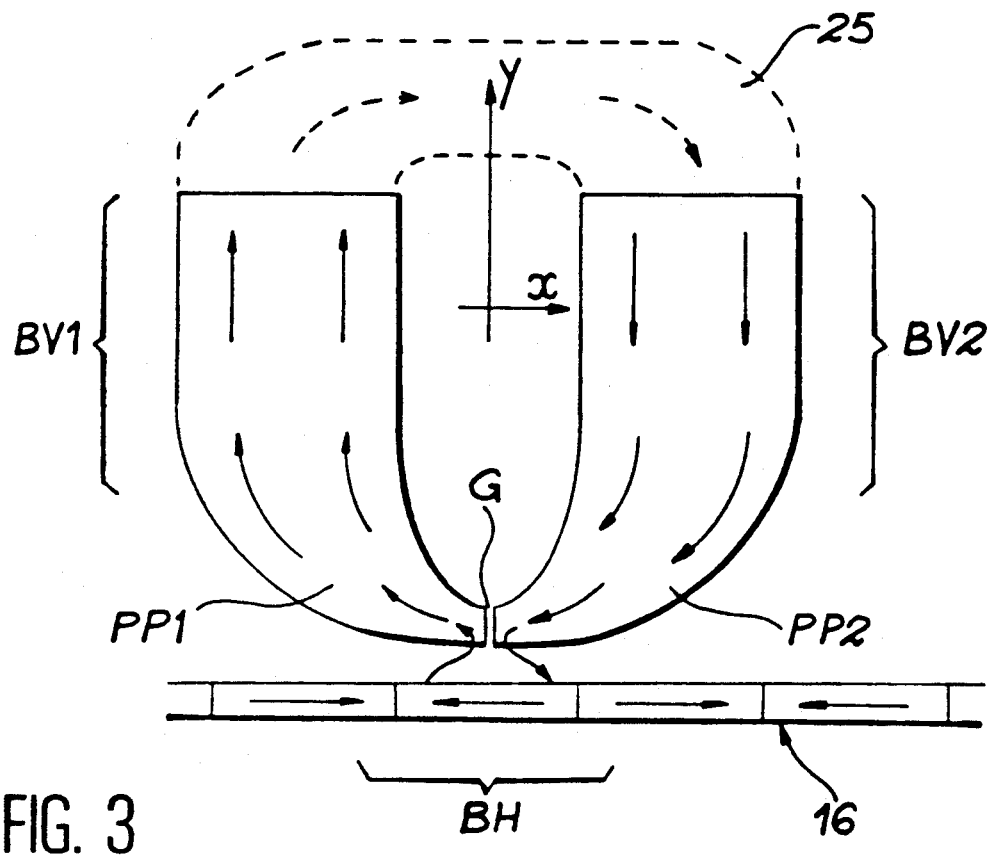
FIG. 3 is a diagram of the magnetic field lines in the pole pieces of a magnetic head.

masking resin layer 42 to define a substantially rectangular pattern surrounding the spacer, followed by the exposure and removal of the resin in order to form a trench (as shown by FIG. 6b in plan view, FIG. 6c in section);

forming a magnetic layer 52, e.g. by electrolytic deposition, during the deposition using the metal layer 32 as the electrode, an external field Hext is applied parallel to the axis y, i.e. parallel to the spacer (FIGS. 6d and 6e), the easy axis of magnetization is then, throughout the magnetic layer 52, parallel to Hext (i.e. to the axis y), the large dimensions of the rectangular pattern avoiding the appearance of edge effects;

removing the residual resin and the magnetic pattern etched by any conventional etching process in order to give it the U shape with its two pole pieces PP1, PP2 separated by an air gap G filled by the spacer 40 (FIG. 6f); the easy axis of magnetization retains its orientation during said etching and is therefore finally appropriately oriented, i.e. parallel to the air gap or spacer.

Referring to FIGS. 7a–7c a second embodiment of the invention will be described. After depositing resin layer 42 over metal layer 32 formed on substrate 30, the following operations are carried out:

forming a trench 60 in resin layer 42 in accordance with FIG. 7a with vertical branches 61 and 62 and a horizontal portion 63 which is much wider than the horizontal branch BH which is formed as described below;

in said trench is formed a magnetic layer 64, e.g. by electrolytic deposition in the presence of a magnetic field Hext directed in accordance with the axis y (FIG. 7a); this is followed by the cutting of the part obtained and its polishing in order to eliminate the lower portion 65 until the desired width is obtained for the horizontal portion 66 (FIG. 7c);

in these cutting and polishing operations, the easy axis of magnetization remains parallel to its direction imposed by Hext, i.e. parallel to the spacer 40.

Figure 4:
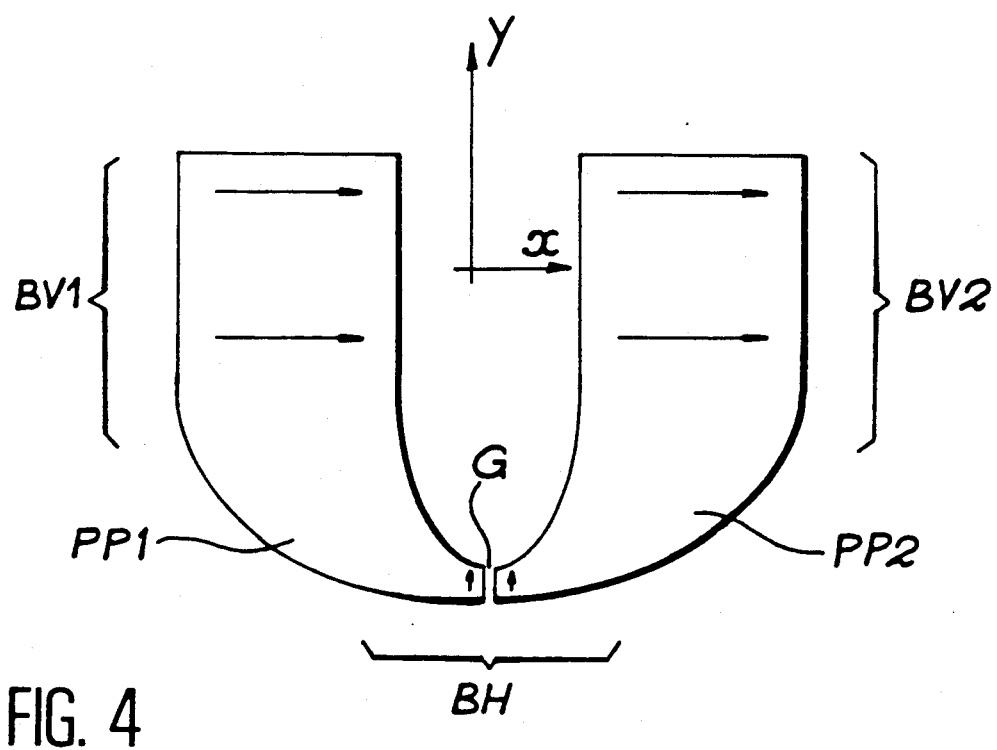
FIG. 4 is a diagram of the ideal orientation for the easy axis of magnetization in a magnetic head.

Although the process described hereinbefore solves the problem of obtaining an easy axis of magnetization parallel to the air gap in the vicinity thereof, which is essential, the head is still not perfect because, in the vertical branches of the U-shaped pole pieces, the easy axis of magnetization does not have the sought orientation (cf. FIG. 4). Although of a secondary nature, this problem can be solved by a third embodiment of the invention by continuing the said process by the operations of the first or second embodiments, as illustrated in FIG. 8.

The component obtained as described hereinbefore (by one of the embodiments of FIGS. 6f or 7c) is covered with resin 70, which is exposed through a mask, developed and then eliminated to leave two trenches 72,74 above vertical branches BV1, BV2 of already formed pole pieces (FIG. 8a).

In these two trenches are formed, e.g. by electrolytic growth, a magnetic layer in the presence of an external magnetic field H'ext parallel to the axis x (FIG. 8b), followed by removing the resin. This gives two overthicknesses 76,78 (FIGS. 8b and 8c), in which the easy axis of magnetization is parallel to the axis x and perpendicular to the flux which then passes in preferred manner in these overthicknesses. These zones also reduce the reluctance of the magnetic circuit, which improves the efficiency of the head, without prejudicing the thinness of the pole pieces in the region of the air gap.

The head obtained (FIG. 8c) then has a double orientation of the easy axis of magnetization, namely parallel to the axis y close to the air gap and parallel to the axis x in the wide branches, which constitutes the ideal desired head.

We claim:

1. A process for producing a magnetic reading and/or writing head comprising a magnetic circuit formed on a substrate having a first part comprised by two pole pieces forming a U-shaped structure with two wide vertical branches and a narrow horizontal branch interrupted by a gap, and a second magnetic flux closure part connecting said two vertical branches of the U-shaped structure, and means for the detection and/or creation of a variation of said magnetic flux, said process comprising the steps of:

forming a nonmagnetic spacer on said substrate, said spacer having a thickness equal to a length of said gap and oriented in a first direction;

depositing over said spacer a magnetic layer while applying a magnetic field having a second direction oriented parallel to said first direction, thereby obtaining an easy axis of magnetization in said magnetic layer parallel to said first direction;

etching said magnetic layer to form said two pole pieces forming said U-shape structure with said two wide vertical branches and said narrow horizontal branch.

2. A process according to claim 1, wherein said step of depositing said magnetic layer comprises depositing a substantially rectangular magnetic layer pattern around said spacer.

3. A process according to claim 1, wherein said step of etching said magnetic layer comprises forming said U-shaped structure with said two wide vertical branches and a horizontal branch having a width greater than a desired width;

said method further comprising the step of cutting said substrate through said horizontal branch followed by polishing said cut substrate to form said horizontal branch having said desired width.

4. A process according to either of claims 2 and 3, further comprising depositing a second magnetic layer on said two vertical branches while applying a magnetic field having a third direction oriented perpendicular to that of said first direction to form two overthicknesses with an easy axis of magnetization perpendicular to said first direction.

5. A process according to either of claims 2 and 3, comprising forming said magnetic layer by electrolytic growth.

6. A process according to claim 4, comprising forming said magnetic layer and said second magnetic layer using electrolytic growth.

* * * * *